(12) United States Patent
Cunningham et al.

(10) Patent No.: US 6,875,460 B2
(45) Date of Patent: Apr. 5, 2005

(54) CO-CRYSTALLIZED POLYOLS AND HYDROGENATED MALTODEXTRIN

(75) Inventors: Mary Lou Cunningham, Wilmington, DE (US); Charles E. Kuenzle, Newark, DE (US); Paul S. Stanizewski, Wilmington, DE (US); Peter Jamieson, New Castle, DE (US)

(73) Assignee: SPI Polyols, Inc., New Castle, DE (US)

( * ) Notice: Subject to any disclaimer, the term of this patent is extended or adjusted under 35 U.S.C. 154(b) by 294 days.

(21) Appl. No.: 09/874,655

(22) Filed: Jun. 5, 2001

(65) Prior Publication Data

US 2002/0011181 A1 Jan. 31, 2002

Related U.S. Application Data

(60) Provisional application No. 60/209,555, filed on Jun. 6, 2000.

(51) Int. Cl.$^7$ ................................................ A23L 1/236
(52) U.S. Cl. ........................ 426/548; 426/658; 426/660
(58) Field of Search ................................ 426/548, 658, 426/659, 660, 661

(56) References Cited

U.S. PATENT DOCUMENTS

| | | | |
|---|---|---|---|
| 5,158,789 A | 10/1992 | DuRoss | ......................... 426/3 |
| 6,143,345 A | 11/2000 | Gonze et al. | ............... 426/548 |

FOREIGN PATENT DOCUMENTS

WO    WO 99/36442    7/1999

OTHER PUBLICATIONS

Velsch. W . AN 407775 FROSTI. abstracting EP 691081 A1. May 1996.*
Code of Federal Regulations: 21 CFR 101.80, Health Claims: dietary sugar alcohols and dental caries, (Apr. 2002) pp. 139–141.

Deis, Ph.D., SPI Polyols, Reprinted from Food Product Design, Sweet by Design, (Feb. 2002).

Deis, Ph.D, Sweetners for Health Foods, Food Product Design, (Feb. 2001) pp. 48–59.

Deis, Ph.D., Polyols in Confectionery, The Manufacturing Confectioner, (Oct. 2000) pp. 53–58.

Berry , Lab Talk Frozen Desserts Formulated with Polyols, Dairy Foods, (Jan. 2004) p. 56.

Renauld, et al., Opting out of sugar, Kennedy's Confection, (Jul. 2003) pp. 33–34, 36–37, 39–41.

Greeley , Not Only Sugar Is Sweet, U.S. Food and Drug Administration, (Apr. 1992) pp. 1–6.

Hyvönen and Koivistoinen, "Food Technological Evaluation of Xylitol," Advances in Food Research, vol. 28 (1982).

* cited by examiner

*Primary Examiner*—Leslie Wong
(74) *Attorney, Agent, or Firm*—Connolly Bove Lodge & Hutz LLP

(57) ABSTRACT

The invention is directed to a co-crystallized product and a method of making the product. The product comprises a polyol and a hydrogenated maltodextrin that have been co-crystallized together. The co-crystallization of polyols and hydrogenated maltodextrin according to the invention provides a sweetener product that is sucrose-free, yet has a reduced sensory cooling effect compared to the original polyol(s). The reduced sensory cooling effect is due to an increase of the heat of solution that is observed when polyols are co-crystallized with hydrogenated maltodextrin. Because the product of the invention is a sucrose-free sweetener that does not demonstrate the strong sensory cooling effect typically found with polyol sweeteners, the invention has a wide variety of applications which previously are not available for polyol sweeteners.

25 Claims, No Drawings

CO-CRYSTALLIZED POLYOLS AND HYDROGENATED MALTODEXTRIN

CLAIM OF PRIORITY

Priority is claimed under 35 U.S.C. §119(e) from U.S. Provisional Application Ser. No. 60/209,555 that was filed Jun. 6, 2000. The prior application is herein incorporated by reference in its entirety.

BACKGROUND OF THE INVENTION

1. Field of the Invention

The present invention involves crystallizable polyol materials produced by the co-crystallization of polyol(s) and hydrogenated maltodextrin.

2. Description of the Related Art

Polyols typically have a sweet taste and have less calories per gram than sucrose. Additionally, most polyols are non-cariogenic and can be used to make dentally-safe "sugar free" products. They are produced by the hydrogenation of carbohydrates. Presently, commonly-used polyols include xylitol, mannitol, sorbitol, and erythritol.

Xylitol is an odorless white crystalline powder that is comparably sweet to sucrose. The heat of solution of crystalline xylitol is −36.6 cal/g, which causes a strong cooling sensation in the mouth when the crystals dissolve. Crystalline xylitol can also change the flavor profile of products, making it unsuitable for many applications. Despite these drawbacks, xylitol is gaining increasing acceptance as an alternative sweetener due to its role in reducing the development of dental caries (cavities). A thorough discussion on the nature and use of xylitol can be found in Lea Hyvönen and Pekka Koivistoinen, "Food Technological Evaluation of Xylitol," *Advances in Food Research*, Vol. 28 (1982).

Erythritol is an odorless white crystalline powder with a clean sweet taste that is similar to sucrose. It is approximately 70 percent as sweet as sucrose and flows easily due to its non-hygroscopic character. Unlike other polyols, erythritol only has 0.2 calories per gram (compared to other polyols which have about 1.6 to 2.6 calories per gram) and is digestible, meaning erythritol does not have the laxative side effects sometimes associated with excessive polyol consumption. The heat of solution of crystalline erythritol is −42.9 cal/g, which causes a strong sensory cooling feeling in the mouth like xylitol.

Sorbitol is a popular bulk sweetener found in numerous food products. In addition to providing sweetness, it is an excellent humectant and texturizing agent. Sorbitol is about 60 percent as sweet as sucrose with one-third fewer calories. Mannitol is a monosaccharide polyol that is about half as sweet as sucrose. Typically mannitol is used as a bulking agent in powdered foods and as a dusting agent for chewing gum. Both sorbitol and mannitol are very stable and chemically unreactive. They can withstand high temperatures and do not brown when heated. The heats of solution of sorbitol and mannitol are −26.5 cal/g and −28.9 cal/g respectively.

A significant drawback to using polyols to sweeten foods is their negative heat of solution. The negative heat of solution of crystalline polyols causes a cooling sensation when the crystals dissolve in the mouth. This cooling sensation is caused by the absorption of energy needed to solvate the crystalline matrix of the polyol. The sensory cooling effect limits the use of crystalline polyols in applications where a granular sucrose-free sweetener would be desirable, such as chocolates and bakery products.

Accordingly, there is a need for a crystallizable polyol material that does not create a strong sensory cooling effect in the mouth. Currently, it is not known how to reduce the sensory cooling effect in pure polyol materials. Experiments with dry blends of crystalline polyols with materials having a less-negative, or positive, heat of solution have had limited success in producing products with heat of solution greater than the original polyol. For example, the heat of solution of hydrogenated maltodextrin ("HM100", a product of Innova LLC, Muscatine, Iowa) is +12.4 cal/g, and when blended with xylitol, the dry blend of hydrogenated maltodextrin and xylitol has a higher heat of solution than pure crystalline xylitol. However, when consuming the dry-blended product, one can perceive spots of high and low cooling, making the dry-blended material unpleasant and unsuitable for most uses. The perceptible differences in cooling reveal that the dry blended product is not completely homogenous. Other experiments have been performed using capsicum (pepper oil) to provide a warm sensation in the mouth, however, the products have not been satisfactory.

SUMMARY OF THE INVENTION

The present invention embodies a composition and the process to make the composition which combines the low-calorie, non-cariogenic properties of polyols but does not possess the sensory cooling effect of crystalline polyols. The inventors have found that the combination of hydrogenated maltodextrin and polyol yields a homogenous sweetener composition having a lesser sensory cooling effect and better storage stability than the original polyol.

The objectives of the invention are the process of co-crystallizing polyol(s) with hydrogenated maltodextrin and the product of the process. The co-crystallized polyol(s) and hydrogenated maltodextrin composition of the invention has the sweetness of the original polyol(s) without the undesired strong sensory cooling effect. Accordingly, it is an object of the present invention to produce a polyol-based sweetener that does not have a strong sensory cooling effect, that is, the heat of solution of the product is greater than that of the original polyol. A further object of the present invention is the ability to adjust the heat of solution for a given ratio of polyol and hydrogenated maltodextrin by altering the amount of shear or agitation applied during manufacturing.

Another object of the co-crystallized polyol and hydrogenated maltodextrin composition is that it has improved flow properties over the original polyol, that is, the composition of the invention has good pour properties and a low tendency to cake or lump. The composition of the invention also has reduced hygroscopicity and improved crystallinity compared to the original polyols. The composition of the invention also has a higher glass transition temperature ($T_g$) relative to the original polyols. The composition of the invention further has improved solubility compared to the original polyols.

It is an object of the present invention to provide a low calorie, low-laxation polyol composition having a reduced sensory cooling effect, for example, co-crystallized erythritol and hydrogenated maltodextrins.

It is also an object of the present invention to provide a polyol composition with low hygroscopicity that is useful in chocolate formulations, for example, co-crystallized erythritol and hydrogenated maltodextrin or co-crystallized mannitol and hydrogenated maltodextrin.

DETAILED DESCRIPTION OF THE PREFERRED EMBODIMENTS

The present invention provides a process for co-crystallizing at least one polyol and hydrogenated maltodextrin. The present invention is also directed to novel compositions of co-crystallized polyol(s) and hydrogenated maltodextrin having a heat of solution greater than the heat of solution of the raw crystalline polyol(s).

Maltodextrins are produced from the hydrolysis of starch. The hydrogenation of maltodextrin is disclosed in Barressi, et al. WO 99/36442 which is herein incorporated by reference. For example, maltodextrin having a dextrose equivalent ("DE") of 10 (MALTRIN M100, GPC Corp., Muscatine, Iowa) is hydrogenated by dissolving the maltodextrin powder in water to form a 55 wt % solids solution. The solution is charged to a reactor with 5% Raney nickel (solids basis) as the hydrogenation catalyst. The reactor is then pressurized with hydrogen to 500 psi, heated to 130° C., and stirred. The reactor is maintained at this temperature and pressure until sampling shows that the reducible sugar has been converted to polyol. The reaction time is typically between 4 to 12 hours, depending on the size and configuration of the reactor used.

When the reaction is completed, the stirring is stopped and the catalyst is allowed to settle. The hydrogenated maltodextrin reaction product is then decanted and filtered to remove fines. The filtered reaction product is next ion-exchanged through a strong cation and strong base anion using methods well known in the art. Finally, the reaction product is evaporated to about 60 wt % to 70 wt % solids for storage.

In a preferred embodiment of the present invention, the maltodextrin prior to hydrogenation has a DE less than 20. In another preferred embodiment, the maltodextrin prior to hydrogenation has a DE from about 5 to about 18. In a highly-preferred embodiment, the maltodextrin prior to hydrogenation has a DE from about 8 to about 18. In the most-preferred embodiment, the maltodextrin prior to hydrogenation has a DE from about 9 to 11.

In a preferred embodiment of the present invention, where xylitol is the polyol, the xylitol content of the co-crystallized composition of the present invention ranges from about 40 wt % to 95 wt %. In another preferred embodiment of the present invention, the xylitol content in the co-crystallized product ranges from about 50 wt % to 80 wt %. In a highly-preferred embodiment of the present invention, the xylitol content ranges from about 68 wt % to 70 wt %.

In a preferred embodiment of the present invention, where erythritol is the polyol, the erythritol content in the co-crystallized product ranges from about 40 wt % to 95 wt %.

In a preferred embodiment of the present invention, where mannitol is the polyol, the mannitol content in the co-crystallized product ranges from about 40 wt % to 95 wt %.

In a preferred embodiment of the present invention, where sorbitol is the polyol, the sorbitol content in the co-crystallized product ranges from about 40 wt % to 95 wt %.

In a preferred embodiment of the present invention, two or more of the above mentioned polyols are co-crystallized with hydrogenated maltodextrin to obtain a product having a greater heat of solution, and hence, a lower sensory cooling effect, than the original polyol combination from which the co-crystallized product was produced. That is, the co-crystallized polyol and hydrogenated maltodextrin composition has a greater heat of solution than a dry blend of co-crystallized polyol and hydrogenated maltodextrin when using the same weight ratio of components.

In a preferred embodiment of the present invention, the heat of solution of the co-crystallized polyol(s) and hydrogenated maltodextrin, which correlates to the sensory cooling effect of the composition, is increased from about 5 percent to almost 100 percent compared to the sensory cooling effect of the polyol(s) used to produce the co-crystallized product.

In another preferred embodiment of the present invention, the heat of solution of the co-crystallized polyol(s) and hydrogenated maltodextrin composition is increased to a level which is about 10 percent to about 80 percent of that of the original polyol(s) from which the co-crystallized product is made. In a highly preferred embodiment of the present invention, the heat of solution of the co-crystallized polyol(s) and hydrogenated maltodextrin composition is increased to a level which is about 50 percent to about 70 percent of that of the original polyol from which the co-crystallized product is made.

A further embodiment of the present invention is the ability to adjust the heat of solution for a given ratio of polyol and hydrogenated maltodextrin in the co-crystallized polyol and hydrogenated maltodextrin composition by altering the amount of shear or agitation applied during manufacturing. In this embodiment, the inventors have unexpectedly found that, by increasing the amount of shear applied during cooling, the heat of solution of the composition decreases, causing a greater cooling effect. Conversely, the inventors have also unexpectedly found that, by decreasing the amount of shear applied during cooling, the heat of solution of the composition increases, causes a lesser cooling effect.

In a preferred embodiment of the present invention, the co-crystallized polyol and hydrogenated maltodextrin composition has a heat of solution equal to, or comparable to, that of sucrose (−4.3 cal/g).

In another preferred embodiment of the present invention, the co-crystallized polyol and hydrogenated maltodextrin product has a similar sweetness, sensory cooling effect, and flavor profile to that of sucrose so that the co-crystallized product can be used as a replacement for sucrose in a variety of applications.

In a preferred embodiment of the present invention, the co-crystallization process is carried out on a bench-top scale using a co-melt process. The dry solid components, i.e., the polyol(s) and hydrogenated maltodextrin, are heated together while agitated until they melt. The melt is then allowed to crystallize, for example, by pouring the material onto a cooling tray and then agitating it to facilitate crystallization.

In another preferred embodiment of the present invention, the co-crystallization is carried out on a larger scale using equipment known in the art to be suitable for the process. This includes the use of a 2-inch thin film crystallizer ("TFC") to facilitate the co-crystallization. The inventors believe the use of the TFC would provide a better material compared to the bench-top process due to the improved ability to control the temperature and amount of solids in the feed stream. Using a TFC, the process parameters of inlet temperature, outlet temperature, flow rate, and cooling water temperature must be adjusted for each polyol(s) and hydrogenated maltodextrin combination described above. The process parameters can be easily determined by a person of ordinary skill in the art. The process parameters are appropriately set when the extrudate from the TFC is an opaque, self-supporting, semi-crystalline rope.

In a currently most-preferred embodiment of the present invention, the TFC used for co-crystallization is a horizontal, jacketed chamber having two shafts with elliptical paddles (Readco Continuous Processor from Teledyne Readco, York, Pa.). A more-detailed description of the Readco TFC can be found in DuRoss, U.S. Pat. No. 5,158,789 (October 1992), which is incorporated herein by reference. The shear imparted by the turning paddles of the Readco TFC nucleates the co-crystallization. The cooling jacket removes heat and promotes crystallization. As the product travels the length of the Readco TFC, its viscosity increases. The extrudate is an opaque, self-supporting, semi-crystalline rope. The process parameters for a currently most-preferred embodiment using the Readco TFC are detailed below in EXAMPLE 1.

Further embodiments of the invention involve the simultaneous hydrogenation of both the polyol precursor, e.g., xylose, maltose, starch hydrolysates, etc., and the maltodextrin and then co-crystallizing the product. These embodiments of the present invention, e.g., co-hydrogenation of xylose and maltodextrin, would be the most practical for large-scale operations.

In a preferred embodiment of the present invention, the co-crystallized product is suited for any market where the cooling effect of polyols would be considered a disadvantage. Some of these markets include chocolate and bakery products. In another embodiment of the present invention, co-crystallized xylitol and hydrogenated maltodextrin and sorbitol and hydrogenated maltodextrin products can be used as a replacement for sucrose in ice cream. Previously, the freezing point reduction caused by using xylitol or sorbitol to sweeten ice cream made it difficult to replace sucrose with those polyols without adversely affecting the taste, texture, and body of the ice cream. However, with the product of the present invention, it has been demonstrated that the addition of either co-crystallized xylitol and hydrogenated maltodextrin or co-crystallized sorbitol and hydrogenated maltodextrin can replace sucrose one-to-one in a standard ice cream formulation with promising results. The ice cream was prepared using methods well known in the industry with the substitution of the co-crystallized xylitol and hydrogenated maltodextrin product one-to-one for sucrose. The ice cream prepared with the co-crystallized product had comparable texture, taste, and body to sucrose-sweetened ice cream. A preferred embodiment of the present invention is a chocolate product comprising the co-crystallized polyol and hydrogenated maltodextrin composition. The inventors have also successfully prepared chocolate coatings substituting the co-crystallized xylitol and hydrogenated maltodextrin product one-to-one for sucrose.

The inventors also expect successful applications for co-crystallized polyol and hydrogenated maltodextrin in hard and soft candies, bakery products such as, but not limited to, pastries and cookies, pharmaceuticals, and bulking agents.

The inventors further expect the co-crystallized product to be suitable for use in energy bars and energy drink mixes. The co-crystallized product is also expected to be useful in oral care products such as toothpastes and tooth powders. Further, the co-crystallized polyol and hydrogenated maltodextrin products possess suitable properties for use in tablets.

In summary, the invention is directed to co-crystallized polyol(s) and hydrogenated maltodextrin product that is characterized by a heat of solution greater than that of either: (1) the polyol(s) alone; or (2) the dry blend of the polyol(s) and the hydrogenated maltodextrin. The invention is also directed to a method of producing the co-crystallized product.

The following examples embody the invention, but should not be used to limit the scope of the invention in any way.

EXAMPLE 1

Co-crystallization Using a Thin Film Crystallizer

The invention is carried out using 18 DE maltodextrin that has been hydrogenated using conventional means ("HM 180", a product of Innova LLC, Muscatine, Iowa) and commercially-available crystalline xylitol (from Xyrofin). A ratio of 90 wt % xylitol and 10 wt % HM180 is used (measured on a dry basis). Water is added to the mixture in an amount sufficient to dissolve the xylitol.

The mixture is blended and the water is evaporated until the mixture is molten, i.e., having less than about 0.3 wt % water. The evaporation conditions for the 90 wt % xylitol to 10 wt % HM180 ratio are 120° C. and 29 inches of water vacuum.

Once the mixture is molten, it is pumped to a Readco horizontal, jacketed chamber containing two shafts with elliptical paddles (Readco Continuous Processor from Teledyne Readco, York, Pa.). The inlet temperature of the mixture is 98° C. The heat of crystallization is removed from the mixture by 35° C. cooling water passed though the TFC cooling jacket. The flow rate of the product is 20 pounds per hour. At the discharge end of the crystallizer, the extrudate is an opaque, self-supporting semi-crystalline rope. The exit temperature is 90° C. The extrudate is deposited on an air-cooled belt as a rope which develops a hard shell as it cools. The rope is cut into 2-inch long pieces which are then collected and allowed to fully cool and harden. Once cool, the pieces are ground and screened.

EXAMPLE 2

Co-crystallized Xylitol and Hydrogenated Maltodextrin

Spray-dried hydrogenated M100 maltodextrin ("HM100", a product of Innova LLC, Muscatine, Iowa), having a DE of 10 prior to hydrogenation, has a measured heat of solution of +12.4 cal/gram. A dry blend of crystalline xylitol (from Xyrofin) and HM100 was prepared having a ratio of 70 wt % xylitol to 30 wt % HM100. The heat of solution of the dry blend was measured to be −23.1 cal/gram using a bomb calorimeter. When the two products were co-crystallized in the same ratio (70 wt % xylitol to 30 wt % HM100), using the co-melt process of the present invention, the resulting co-crystallized product had a heat of solution of −16.4 cal/gram. This value is substantially higher than either the raw crystalline xylitol (−36.6 cal/g) or the dry blend.

A co-crystallized product was also successfully produced using a ratio of 90 wt % xylitol to 10 wt % HM100. However, a ratio of 45 wt % xylitol to 55 wt % HM100 did not crystallize and no heat of solution was measured for this product.

The co-crystallized 70:30 wt % xylitol and HM100 product produced the best results. The product did not have any unusual flavors. It also ground easily and remained flowable when stored at room temperature and humidity. In contrast, raw crystalline xylitol clumps when stored under the same conditions.

To prepare the examples shown in TABLE A below, the co-crystallization process was performed by heating both the dry crystalline xylitol and HM100 together ("co-melt") to 330° F. while agitating. After the materials melted, they were poured into a tray and then agitated to facilitate crystallization. The crystallized material was then ground, sifted using a −20/+60 mesh screen set, i.e., 100 percent passed through a 20-mesh screen, and 100 percent retained on a 60-mesh screen, and analyzed. The heat of solution of the product was measured using a bomb calorimeter.

TABLE A

Examples of co-crystallized xylitol and hydrogenated maltodextrin.

| Ratio of Components | Xylitol, crystalline (g) | HM100 (g) | Water (g) | Heat of Solution (cal/g) |
|---|---|---|---|---|
| 45 wt % xylitol to 55 wt % HM100 | 91.0 | 189.0 | 70.0 | N/A |
| 70 wt % xylitol to 30 wt % HM100 | 140.0 | 60.0 | none | −16.4 |
| 90 wt % xylitol to 10 wt % HM100 | 180.0 | 20.0 | none | −24.7 |

EXAMPLE 3

Co-crystallized Xylitol and Hydrogenated Maltodextrin

Co-crystallized xylitol and hydrogenated maltodextrin examples were prepared using the following process. In a beaker, spray-dried hydrogenated M100 maltodextrin ("HM100", a product of Innova LLC, Muscatine, Iowa), having a DE of 10 prior to hydrogenation, crystalline xylitol (from Xyrofin), and water were combined in the appropriate weight ratios to obtain the compositions shown in TABLE B. The mixtures were heated to 290° F. until thick, at which point the beaker was removed from the heat source. The mixture was then poured into a stainless steel bowl and mixed with a Hobart planetary mixer using a delta paddle at high speed. The mixture was mixed until a dull, as opposed to glassy, opaque dough was formed. The dough was then rolled into ropes approximately ⅜ to 1.5 inches in diameter and 4 to 10 inches long. These ropes were then cured in an oven at 40° C. and 10% relative humidity for three days. The ropes were then ground in a blender. The heat of solution for the examples was measured using a bomb calorimeter.

TABLE B

Examples of co-crystallized xylitol and hydrogenated maltodextrin compared to neat xylitol and a dry blend of xylitol and hydrogenated maltodextrin.

| Ratio of Components | Sample Weight (g) | Water (g) | Heat of Solution (cal/g) |
|---|---|---|---|
| neat xylitol | 8.4985 | 89.2636 | −37.386 |
| 100% xylitol | 8.5062 | 89.2583 | −36.204 |
|  | 8.5014 | 89.2095 | −36.204 |
|  |  |  | avg. = −36.60 |
| co-crystallized | 8.5172 | 89.2705 | −30.999 |
| 90% xylitol to 10% HM100 | 8.5180 | 89.2478 | −30.416 |
|  | 8.5186 | 89.2332 | −30.983 |
|  |  |  | avg. = −30.80 |
| co-crystallized | 8.5441 | 89.0050 | −28.543 |
| 80% xylitol to 20% HM100 | 8.5440 | 89.3432 | −27.496 |
|  | 8.5341 | 89.2608 | −27.502 |
|  |  |  | avg. = −27.85 |
| co-crystallized | 8.5266 | 89.1699 | −22.916 |
| 70% xylitol to 30% HM100 | 8.5495 | 89.0031 | −23.962 |
|  | 8.5358 | 89.8020 | −23.617 |
|  |  |  | avg.= −23.50 |
| dry blend | 8.5013 | 89.0504 | −34.425 |
| 90% xylitol to 10% HM100 | 8.5116 | 89.2489 | −33.308 |
|  |  |  | avg. = −33.87 |

EXAMPLE 4

Co-crystallized Erythritol and Hydrogenated Maltodextrin

Erythritol (from Doosan) was co-crystallized with spray-dried hydrogenated M100 maltodextrin ("HM100", a product of Innova LLC, Muscatine, Iowa) at a ratio of 90 wt % erythritol to 10 wt % HM100. A mixture of the dry powders was co-melted by heating to 340° C. while stirring. The mixture easily crystallized as it cooled. A slight yellow color was observed when the material was poured and set.

The co-crystallized product had a reduced sensory cooling effect in the mouth compared to the original raw crystalline erythritol. Using a bomb calorimeter, the heat of solution of the co-crystallized product was −38.1 cal/g. In comparison, the heat of solution of raw crystalline erythritol is −42.9 cal/g.

When tasted, the co-crystallized erythritol and hydrogenated maltodextrin product had an unusual flavor that was not present in the original erythritol. The cause of the unusual taste is not known.

Another co-crystallized erythritol composition was made using a ratio of 50:50 wt % erythritol and HM100. A mixture of the dry powders was heated while being stirred until it melted. Once the mixture was fully melted, it was removed from heat. As the mixture cooled, surface crystallization was observed. The composition of the surface crystals is believed to be erythritol falling out of solution and crystallizing.

In addition to the specific examples set forth above, the invention also relates to co-crystallized polyol and hydrogenated maltodextrin where the polyol is mannitol or sorbitol. The procedure for carrying out the invention with these polyols is the same co-melt process described above. The invention also contemplates any other means known or later developed in the industry that would be suitable for the co-crystallization of polyols and hydrogenated maltodextrins. Further, the invention contemplates the simultaneous co-crystallization of two or more polyols with hydrogenated maltodextrin.

EXAMPLE 5

Co-crystallized Erythritol and Hydrogenated Maltodextrin

Co-crystallized erythritol and hydrogenated maltodextrin examples were prepared using the following process. In a beaker, spray-dried hydrogenated M100 maltodextrin ("HM100", a product of Innova LLC, Muscatine, Iowa), having a DE of 10 prior to hydrogenation, erythritol (from Doosan), and water were combined in the appropriate weight ratios to obtain the compositions shown in TABLE C. The mixtures were heated to 290° F. until thick, at which point the beaker was removed from the heat source. The mixture was then poured into a stainless steel bowl and mixed with a Hobart planetary mixer using a delta paddle at high speed. The mixture was mixed until a dull, as opposed to glassy, opaque dough was formed. The dough was then rolled into ropes approximately ⅜ to 1.5 inches in diameter and 4 to 10 inches long. These ropes were then cured in an oven at 40° C. and 10% relative humidity for three days. The ropes were then ground in a blender. The heat of solution for the examples was measured using a bomb calorimeter.

TABLE C

Examples of co-crystallized erytliritol and hydrogenated maltodextrin compared to neat erythritol.

| Ratio of Components | Sample Weight (g) | Water (g) | Heat of Solution (cal/g) |
|---|---|---|---|
| neat erythritol | 8.7426 | 89.2872 | −44.291 |
| 100% erythritol | 8.7361 | 89.7860 | −45.674 |
|  | 8.7318 | 89.0483 | −45.912 |
|  |  |  | avg. = −45.29 |
| co-crystallized | 8.5450 | 89.2132 | −36.609 |
| 80% erythritol to 20% HM100 | 8.5884 | 89.2672 | −36.460 |
|  | 8.5109 | 89.2590 | −36.760 |
|  |  |  | avg. = −36.61 |
| co-crystallized | 8.546 | 89.1987 | −25.162 |
| 60% erythritol to 40% HM100 | 8.509 | 89.3451 | −25.300 |
|  | 8.513 | 89.2236 | −25.268 |
|  |  |  | avg. = −25.24 |
| co-crystallized | 8.5499 | 89.1780 | −19.432 |
| 50% erythritol to 50% HM100 | 8.5239 | 89.0454 | −19.459 |
|  | 8.5313 | 89.4500 | −19.542 |
|  |  |  | avg. = −19.47 |

EXAMPLE 6

Co-crystallized Mannitol and Hydrogenated Maltodextrin

Co-crystallized mannitol and hydrogenated maltodextrin examples were prepared using the following process. In a beaker, spray-dried hydrogenated M100 maltodextrin ("HM100", a product of Innova LLC, Muscatine, Iowa), having a DE of 10 prior to hydrogenation, spray dried mannitol ("MANNITOL EZ", a product of SPI Polyols, Inc., New Castle, Del.), and water were combined in the appropriate weight ratios to obtain the compositions shown in TABLE D. The mixtures were heated to 290° F. until thick, at which point the beaker was removed from the heat source. The mixture was then poured into a stainless steel bowl and mixed with a Hobart planetary mixer using a delta paddle at high speed. The mixture was mixed until a dull, as opposed to glassy, opaque dough was formed. The dough was then rolled into ropes approximately ⅜ to 1.5 inches in diameter and 4 to 10 inches long. These ropes were then cured in an oven at 40° C. and 10% relative humidity for three days. The ropes were then ground in a blender.

For the co-crystallization of mannitol and HM100 using a spray drier, a Yamato lab scale spray dryer (Model DL 41) was used with the following settings:

Feed solids level—40%

Feed temperature—77° F.

Inlet air temperature—572° F.

Outlet air temperature—165° F.

Air pressure to atomizer—90 psi.

For these examples, the heat of solution for the examples was measured using a bomb calorimeter.

TABLE D

Examples of co-crystallized mannitol and hydrogenated maltodextrin compared to neat mannitol.

| Ratio of Components | Sample Weight (g) | Water (g) | Heat of Solution (cal/g) |
|---|---|---|---|
| neat mannitol (spray dried) | 8.4971 | 89.1446 | −27.579 |
| 100% mannitol | 8.5070 | 89.2489 | −28.728 |
|  | 8.4410 | 89.2620 | −28.358 |
|  |  |  | avg. = −28.22 |
| co-crystallized using spray drier | 5.8861 | 100.8944 | −7.256 |
| 50% mannitol to 50% HM100 | 6.9752 | 100.128 | −7.677 |
|  | 6.9852 | 100.5231 | −7.695 |
|  |  |  | avg. = −7.54 |
| co-crystallized (−40, +170) | 8.5123 | 89.1712 | −20.656 |
| 75% mannitol to 25% HM100 | 8.5029 | 89.1442 | −20.671 |
|  | 8.4984 | 89.1700 | −19.537 |
|  |  |  | avg. = −20.29 |
| co-crystallized (−170) | 8.5070 | 89.1930 | −21.246 |
| 75% mannitol to 25% HM100 | 8.1010 | 89.2131 | −21.622 |
|  | 8.5158 | 89.2065 | −21.803 |
|  |  |  | avg. = −21.56 |

EXAMPLE 7

Varying the Heat of Solution Through the Amount of Shear Applied During Cooling

The product heat of solution can be affected by altering the amount of mixing or shear applied during the manufacturing process. Two examples were made, one using a low-shear method, and another with a high-shear method.

Initially, a co-crystallized xylitol and hydrogenated maltodextrin product was prepared using the following low-shear process. In a beaker, 30 parts spray-dried hydrogenated M100 maltodextrin ("HM100", a product of Innova LLC, Muscatine, Iowa), having a DE of 10 prior to hydrogenation, 70 parts crystalline xylitol (from Xyrofin), and 50 to 100 parts water were combined. The mixture was heated to 290° F. until thick, at which point the beaker was removed from the heat source. The mixture was then poured onto a flat aluminum cookie sheet and less than 5 g of crystalline xylitol was added to seed crystallization of the product. The mixture was then stirred by hand until a viscous, opaque mass was formed. At this point, the mixture was allowed to cool overnight at approximately 68° F. and 29% relative humidity. The cooled mixture was then broken up by hand and ground in a blender. Using this low-shear method, the product had a relatively low crystallinity. The measured heat of solution for this product was −16.4 cal/g.

Next, a co-crystallized xylitol and hydrogenated maltodextrin product was prepared using the following high-shear process. In a beaker, 30 parts spray-dried hydrogenated M100 maltodextrin ("HM100", a product of Innova LLC, Muscatine, Iowa), having a DE of 10 prior to hydrogenation, 70 parts crystalline xylitol (from Xyrofin), and 50 to 100 parts water were combined. The mixture was heated to 290° F. until thick, at which point the beaker was removed from the heat source. The mixture was then poured into a stainless steel bowl and mixed with a Hobart planetary mixer using a delta paddle at high speed. The mixture was mixed until a dull, as opposed to glassy, opaque dough was formed. The dough was then rolled into ropes approximately ⅜ to 1.5 inches in diameter and 4 to 10 inches long. These ropes were then cured in an oven at 40° C. and 10% relative humidity for three days. The ropes were then ground in a blender. Using this high-shear method, the product had a relatively high crystallinity. The measured heat of solution for this product was −23.5 cal/g.

EXAMPLE 8

Chocolate Composition

Sugar-free chocolate was made with co-crystallized hydrogenated maltodextrin ("HM 100", a product of Innova LLC, Muscatine, Iowa), having a DE of 10 prior to hydrogenation and xylitol or erythritol. The chocolate products had improved taste profiles with respect to cooling as compared to sugar-free chocolate made with neat xylitol or erythritol.

The chocolate examples containing sucrose, polyol, and the co-crystallized polyol and hydrogenated maltodextrin were made according to the following procedure. Combine 50 parts of the sweetener (sucrose, polyol, or co-crystallized polyol and hydrogenated maltodextrin) with 40 parts chocolate liquor, and 9.5 parts cocoa butter. Mix and heat the mixture to 120° F. until the mass has the consistency of wet, sandy paste. The paste is then milled by passing it through a chilled, chrome three-roller mill gapped to 25 1 $\mu$m (Kent Machinery Works, Inc.). The milled paste is then placed in a Hobart planetary mixer and mixed with a delta paddle at low speed. Next 0.5 parts lecithin was added and the mixture is reheated to 120° F. At 120° F., more cocoa butter is slowly added until the mixture has a viscosity of about 6000 cps measured using a Brookfield RVT viscometer. Next, 240 g of the chocolate mixture is placed in a Barbender Viscocorder. The paddle of the Visco-corder was set at 50 rpm and cool temperature of 32° C. The chocolate mixture was held at this temperature for five minutes. Then the mixture was cooled to 26° C., and the viscosity was approximately 400 Barbender units compared to the baseline viscosity. The chocolate mixture was then reheated to 32° C. and the viscosity was about 40 to 60 Barbender units greater than the baseline viscosity. The chocolate mixture was then poured into molds and allowed to harden.

These examples were prepared using sucrose and maltitol ("ALMALTY MR 50", a product of Towa Chemical Industry Company, Ltd., Japan) as controls. Additionally, examples were prepared with neat crystalline xylitol (from Xyrofin) and neat crystalline erythritol (from Doosan). Further, examples were made using the co-crystallized xylitol and HM100 of Example 3 at weight ratios of 90 wt. % xylitol to 10 wt. % HM100 and 70 wt. % xylitol to 30 wt. % HM100. Examples were also made using the co-crystallized erythritol and HM 100 of Example 5 at weight ratios of 90 wt. % erythritol to 10 wt. % HM100 and 70 wt. % erythritol to 30 wt. % HM100. When the examples were tasted, the neat xylitol and erythritol samples had a noticeable cooling effect compared to the sucrose control. In contrast, the 90/10 co-crystallized xylitol and HM100 and the 90/10 co-crystallized erythritol and HM100 had a reduced sensory cooling effect. The sensory cooling effect of the 70/30 co-crystallized xylitol and HM100 and the 70/30 co-crystallized erythritol and HM100 samples had a significantly reduced sensory cooling effect. Additionally, the sweetness of the chocolates prepared using the co-crystallized polyols and HM100 was comparable to the sucrose control.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A co-crystallized polyol and hydrogenated maltodextrin sweetener composition comprising at least one polyol and a hydrogenated maltodextrin, wherein the composition is formed by co-crystallization of the at least one polyol and the hydrogenated maltodextrin.

2. The co-crystallized polyol and hydrogenated maltodextrin sweetener composition of claim 1, wherein the at least one polyol is selected from the group consisting of xylitol, mannitol, sorbitol, and erythritol.

3. The co-crystallized polyol and hydrogenated maltodextrin sweetener composition of claim 1, wherein the at least one polyol is xylitol.

4. The co-crystallized polyol and hydrogenated maltodextrin sweetener composition of claim 1, wherein the at least one polyol is erythritol.

5. The co-crystallized polyol and hydrogenated maltodextrin sweetener composition of claim 1, wherein the maltodextrin, prior to hydrogenation, has a DE value of less than 20.

6. The co-crystallized polyol and hydrogenated maltodextrin sweetener composition of claim 1, wherein the maltodextrin, prior to hydrogenation, has a DE value of from about 5 to about 18.

7. The co-crystallized polyol and hydrogenated maltodextrin sweetener composition of claim 1, wherein the maltodextrin, prior to hydrogenation, has a DE value of from about 8 to about 18.

8. The co-crystallized polyol and hydrogenated maltodextrin sweetener composition of claim 1, wherein the maltodextrin, prior to hydrogenation, has a DE value of from about 9 to about 11.

9. The co-crystallized polyol and hydrogenated maltodextrin sweetener composition of claim 1, wherein the at least one polyol is xylitol, and wherein said xylitol is present in the amount from 40 to 95 weight percent, based on the composition.

10. The co-crystallized polyol and hydrogenated maltodextrin sweetener composition of claim 1, wherein the at least one polyol is xylitol, and wherein said xylitol is present in the amount from 50 to 80 weight percent, based on the composition.

11. The co-crystallized polyol and hydrogenated maltodextrin sweetener composition of claim 1, wherein the at least one polyol is xylitol, and wherein said xylitol is present in the amount from 68 to 70 weight percent, based on the composition.

12. The co-crystallized polyol and hydrogenated maltodextrin sweetener composition of claim 1, wherein the at least one polyol is erythritol, and wherein said erythritol is present in the amount from 40 to 95 weight percent, based on the composition.

13. The co-crystallized polyol and hydrogenated maltodextrin sweetener composition of claim 1, wherein the at least one polyol is mannitol, and wherein said mannitol is present in the amount from 40 to 95 weight percent, based on the composition.

14. The co-crystallized polyol and hydrogenated maltodextrin sweetener composition of claim 1, wherein the at least one polyol is sorbitol, and wherein said sorbitol is present in the amount from 40 to 95 weight percent, based on the composition.

15. A co-crystallized polyol and hydrogenated maltodextrin sweetener composition comprising at least one polyol and a hydrogenated maltodextrin, wherein the heat of solution of the composition is reduced from 5 to 100 percent from the heat of solution of the at least one polyol.

16. The co-crystallized polyol and hydrogenated maltodextrin sweetener composition of claim 15, wherein the heat of solution of the composition is from 10 to 80 percent of that of the at least one polyol.

17. The co-crystallized polyol and hydrogenated maltodextrin sweetener composition of claim 15, wherein the heat of solution of the composition is from 50 to 70 percent of that of the at least one polyol.

18. The co-crystallized polyol and hydrogenated maltodextrin sweetener composition of claim 1, wherein the heat of solution of the composition is about −4.3 cal/g.

19. The co-crystallized polyol and hydrogenated maltodextrin sweetener composition of claim 15, wherein the heat of solution of the co-crystallized polyol composition is greater than a dry-blend of the at least one polyol and the hydrogenated maltodextrin using the same ratio as used in the co-crystallized polyol composition.

20. A co-crystallized polyol and hydrogenated maltodextrin sweetener composition comprising at least one polyol and a hydrogenated maltodextrin, wherein the composition is produced by a process comprising:

(a) co-melting the at least one polyol and the hydrogenated maltodextrin to form a melt; and (b) cooling the melt;

wherein shear is applied to the melt during cooling.

21. The co-crystallized polyol and hydrogenated maltodextrin sweetener composition of claim 20, wherein the process is performed using a thin-film crystallizer.

22. The co-crystallized polyol and hydrogenated maltodextrin sweetener composition of claim 20, wherein the heat of solution of the composition can be adjusted by the amount of shear applied to the composition during cooling.

23. The co-crystallized polyol and hydrogenated maltodextrin sweetener composition of claim 22, wherein the heat of solution of the composition can be increased by decreasing the amount of shear applied to the composition during cooling.

24. The co-crystallized polyol and hydrogenated maltodextrin sweetener composition of claim 20, wherein the heat of solution of the composition can be decreased by increasing the amount of shear applied to the composition during cooling.

25. A chocolate composition comprising chocolate and the co-crystallized polyol and hydrogenated maltodextrin sweetener composition of claim 1.

* * * * *